UNITED STATES PATENT OFFICE.

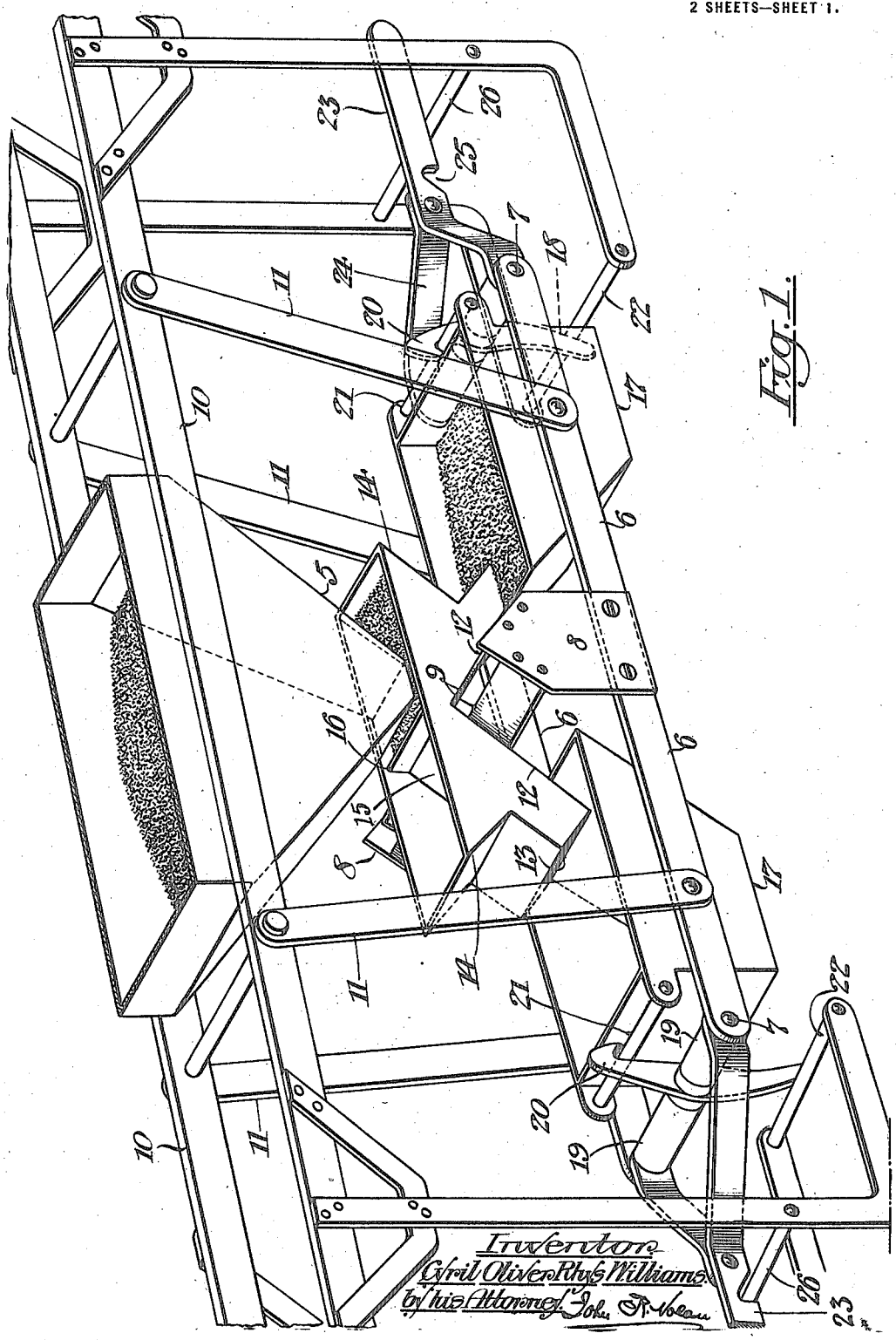

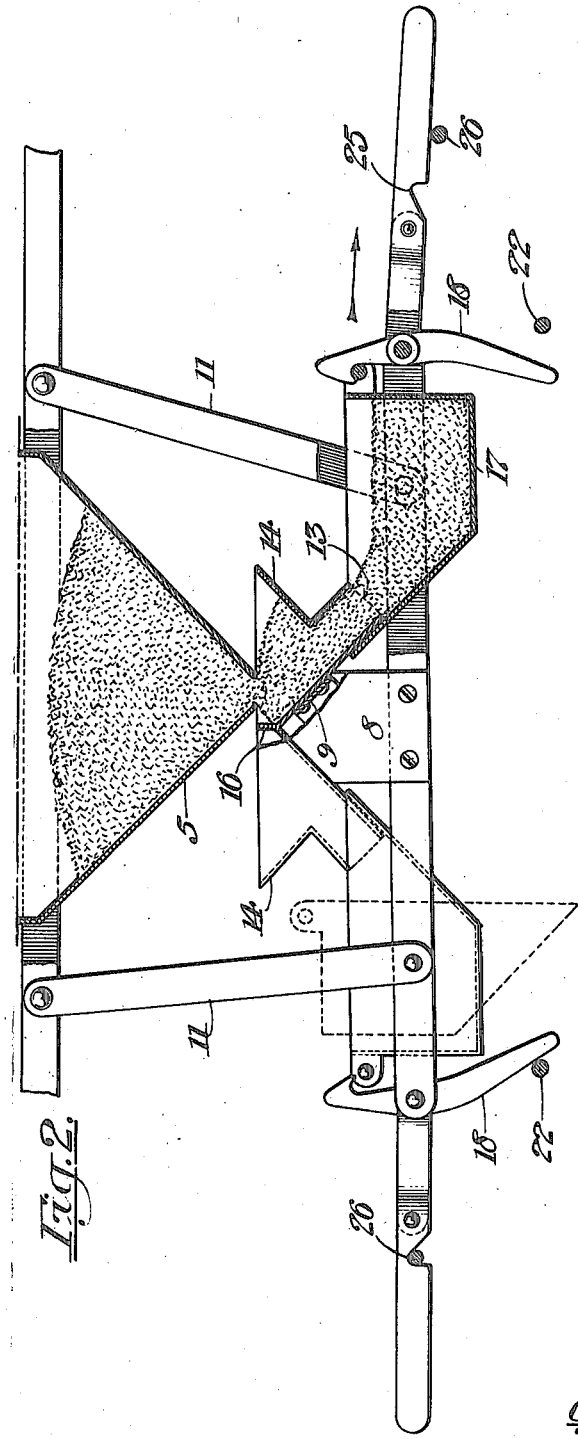
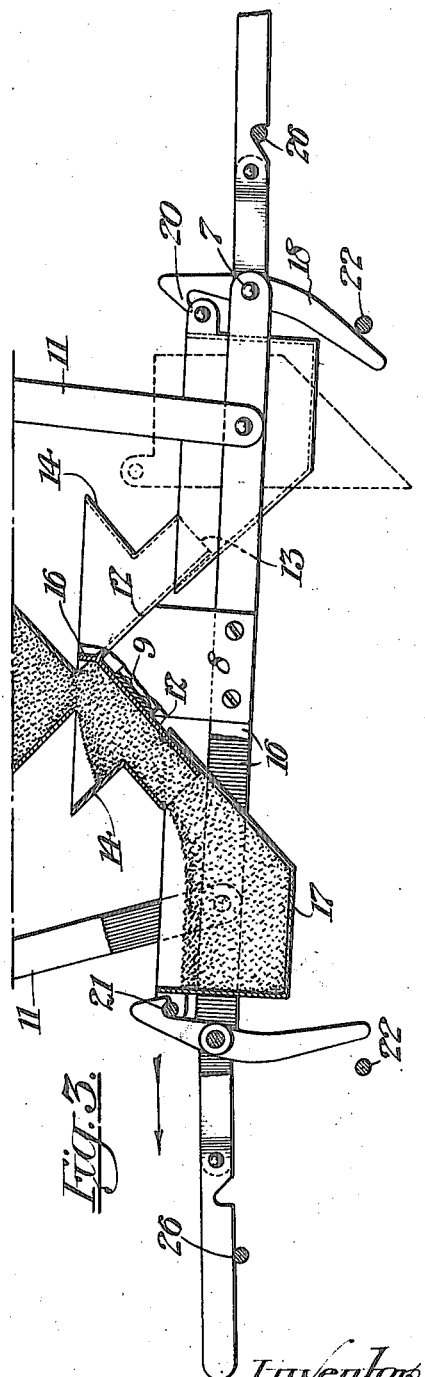

CYRIL OLIVER RHYS WILLIAMS, OF BARBERTON, OHIO.

MEASURING APPARATUS.

1,264,732.

Specification of Letters Patent.

Patented Apr. 30, 1918.

Application filed August 5, 1916. Serial No. 113,273.

*To all whom it may concern:*

Be it known that I, CYRIL OLIVER RHYS WILLIAMS, a subject of the King of Great Britain and Ireland, and resident of Barberton, in the county of Summit and State of Ohio, have invented certain new and useful Improvements in Measuring Apparatus, of which the following is a specification.

This invention relates to an apparatus for measuring sand, crushed stone, ore, and the like; my object being to provide a simple and efficient construction and organization of mechanism whereby substantially equal quantities of material may be delivered from a mass in rapid succession.

My invention, generally stated, comprises a hopper, or other suitable container, having a discharge opening; a reciprocative structure having two chambers in spaced relation to each other provided each with an inlet and an outlet, and being movable in alternate succession toward and from the said discharge opening; said structure also having two pivotally-mounted buckets movable relatively to the outlets of the chambers, together with means for temporarily locking said buckets in close relation to the respective outlets. By movement of said structure in one direction one of the chambers, with its associated bucket, may be positioned to receive a measured quantity of material from the hopper, and then by movement of the structure in the opposite direction the other chamber, and its bucket, may be positioned to receive a measured quantity of material from the hopper.

The invention also comprises trip devices whereby in each movement of the structure to loading position, the locking devices of the previously loaded bucket are tripped, in such a manner as to release the said bucket and permit the dumping of its contents and the discharge of the material from the complementary chamber.

The invention also comprises structural features which will be hereinafter described and claimed.

In the drawings—

Figure 1 is a perspective view of a measuring apparatus embodying a good form of my invention, showing the parts in the relative positions which they occupy immediately preceding the discharge of a measured quantity of material from the right-hand bucket.

Fig. 2 is a side elevation, partly in section, of the apparatus showing the parts relatively positioned as in Fig. 1.

Fig. 3 is a similar view, showing the left-hand bucket as filled preparatory to the discharge of its contents.

Referring to the drawings, 5 designates the open discharging portion of a hopper or other structure adapted to contain an accumulation of material to be measured, which hopper is fixedly supported in any suitable manner. Below the hopper is a horizontally-reciprocative frame comprising, in the present instance, two parallel rails 6 which are spaced apart and connected at their respective ends by tie-rods 7. The rails are provided midway between their ends with uprights 8 which are rigidly connected at their upper portions by oppositely-inclined cross-bars 9, thus providing a rigid and substantial skeleton structure. The frame is suspended from suitable structural work, including stationary beams 10, by means of a series of links 11, of which in the present instance there are four arranged in pairs. One pair of links is disposed at or near one end of the frame and the other pair at or near the opposite end of the frame. The two pairs of pendant links slightly converge downwardly, so that if a load be imposed at or near either end of the frame the loaded end will be swung downward within limits and thus move the frame longitudinally unless it be temporarily locked, as will presently appear.

Supported upon the inclined cross-bars 9 of the frame, in close relation to the discharge portion of the hopper, is a double funnel-like structure, which by actuation of the frame may be reciprocated beneath the hopper so as to present either chamber of the structure to the hopper opening, as desired. In the present instance this funnel structure comprises two downwardly diverging chambers 12 which terminate in outlet nozzles 13 in spaced relation to each other; the end walls 14 of the chambers above the nozzles being preferably inclined upwardly and outwardly to afford mouths of ample capacity for the respective chambers. On the apex of the inner inclined walls 15 of these chambers is a transverse partition 16 which extends to or near to the top of the funnel structure, so as to travel in proximity to the hopper opening when the frame is actuated.

Pivoted in spaced relation to each other between the rails of the frame are two buckets 17 which are alternately movable toward and from the outlets of the respective funnel chambers, whereby when either chamber is in communication with the hopper opening the material may be discharged into such chamber and thence into the adjacent bucket; and whereby also, upon the supply of a sufficient quantity of material to said chamber and bucket, the chamber may be shifted from the hopper opening and the bucket swung downward to discharge its contents and at the same time permit the escape of the contents of the chamber.

When the frame is shifted the other funnel chamber and its bucket are disposed in loading position, and the measuring and discharging operations are repeated, and so on in succession. The aggregate capacity of each chamber and bucket constitutes a predetermined measure, and hence a succession of substantially equal quantities of the material may be delivered from the hopper.

The formation of each of the buckets and the location of its axis in respect to the center of gravity are such that the bucket normally swings into receiving position in relation to the outlet of its funnel chamber after the discharge of its contents; means being provided whereby the bucket is temporarily locked in its normal position during the filling of the bucket. The axis of oscillation of the bucket is also such that when the filled bucket is unlocked, the inner end of the bucket automatically swings downward and discharges the material, as above mentioned. In the present instance the locking means for each bucket comprises a vertically-disposed latch lever 18 which is appropriately hung on the adjacent tie-rod 7 of the frame, suitable distance pieces 19 being applied to the rod. The upper arm of the lever includes a shouldered head 20 with which engages a suitably-disposed cross-rod 21 on the upper portion of the outer end of the bucket when the bucket is in its normal position. On the supporting frame work, adjacent the depending arms of the latch levers, are stationary trip rods 22 against which said arms respectively are caused to impinge in the successive strokes of the frame; that is to say, in the movement of the frame to the right after the filling of the right-hand chamber and bucket, the right-hand latch lever abuts against the opposing trip rod 22, and is thereby shifted to unlatch the bucket; and in the movement of the frame to the left a corresponding tripping of the left-hand latch lever is effected by the opposing rod 22.

As a simple and efficient means to lock the movable frame temporarily in each filling position, said frame is provided at its ends with projecting locking bars 23 having bifurcated portions 24 which are pivotally mounted on the respective tie-rods 7. The bars are provided on their undersides with notches 25 which successively engage suitably-disposed latch-rods 26 respectively on the supporting frame work. By raising either latch from engagement with the proximate rod 26, the movable frame can be readily released preparatory to its shifting to the right or the left as the case may be.

The operation of the preferred form of apparatus above described may be briefly summarized as follows: Assuming the elements to occupy the relative positions shown in Figs. 1 and 2 with the right-hand chamber and bucket locked by the adjacent latch lever 18 and supplied with material from the hopper 5, it will be seen that by virtue of the relative inclination of the suspension links, the tendency of the frame is to swing by gravity in the direction indicated by the arrow in Fig. 2. The frame, however, is temporarily restrained by the engagement of the left-hand locking bar of the frame with the adjacent latch rod 26. The material is prevented from overflowing the sides of the chamber by the fact that it has assumed its natural angle of repose and thus has choked the hopper opening. If now the left-hand locking bar be lifted by hand, (or by any suitable means) the frame, buckets and funnel structure will automatically swing by gravity in the direction indicated by the arrow in Fig. 2 until the right-hand bar engages the adjacent latch rod 26, as represented in Fig. 3. In this movement of the frame and adjuncts the right-hand latch lever abuts against the opposing trip rod 22, thus releasing the loaded bucket, which swings by gravity to dumping position and then upon discharge of the measured load returns by gravity to filling position. The partition of the funnel structure is now at the right-hand side of the hopper opening and will permit the flow of material into the left-hand chamber and bucket, which latter is locked in raised position by the adjacent latch device.

The weight of the left-hand load will tend to swing the temporarily restrained frame to the left, and upon raising the right-hand locking bar the frame will automatically swing by gravity in the direction indicated by the arrow in Fig. 3 until the left-hand bar 23 engages the adjacent latch rod 26, as seen in Fig. 2, and so on.

From the foregoing it will be seen that the actuation of the frame in its successive movements from side to side, and the timely dumping of the buckets and their return to filling position, are effected in each instance by the force of gravity, thus avoiding the employment of extraneous power transmitting devices, and providing a measuring apparatus by means of which the defined object of my invention is attained.

It is to be understood that my invention is not limited to the specific details of construction herein shown and described, as the mechanism may be variously modified within the scope of the appended claims.

I claim—

1. The combination with a source of supply of material to be measured, of a two-chambered measuring structure, means for suspending said structure in close relation to the source of supply, said means including converging pendulous links arranged at the respective sides of the source of supply and pivotally connected at their lower ends to the measuring structure, and means for temporarily locking said structure in position with either chamber in communication with the source of supply, whereby when the communicating chamber is filled and the locking means released the loaded chamber causes the structure bodily to gravitate to a position in which the other chamber communicates with the source of supply.

2. The combination with a source of supply of material to be measured, of a two-chambered measuring structure, including pivoted buckets for the respective chambers, means for suspending said structure and its buckets in close relation to the source of supply, means for temporarily locking said structure in position with either chamber in communication with the source of supply, and means for temporarily locking said buckets in closed position with relation to the respective chambers, the suspension means being so arranged in relation to the center of gravity that when the communicating chamber and its bucket are filled and the locking means for the structure released, the loaded chamber causes the structure bodily to gravitate to a position in which the other chamber communicates with the source of supply.

3. The combination with a source of supply of material to be measured, of a two-chambered measuring structure, including pivoted buckets for the respective chambers, means for suspending said structure and its buckets in close relation to the source of supply, means for temporarily locking said structure in position with either chamber in communication with the source of supply, and means for temporarily locking said buckets in closed position with relation to the respective chambers, the suspension means being so arranged in relation to the center of gravity that when the communicating chamber and its bucket are filled and the locking means for the structure released, the loaded chamber causes the structure bodily to gravitate to a position in which the other chamber communicates with the source of supply, together with devices for automatically tripping the locking means of the filled bucket during the movement of the said structure, whereby the contents of the said bucket and its associated chamber are discharged.

4. The combination with a source of supply of material to be measured, of two measuring buckets pivotally-mounted in spaced relation to each other, a movable gravity actuated support for said buckets, converging pendulous links arranged at the respective sides of the source of supply and pivotally connected at their lower ends to said support, and a funnel structure on said support having chambers for feeding material from the source of supply to the respective buckets, said chambers being movable alternately to filling position by actuation of the support, and means for temporarily locking said buckets in receiving position relatively to the respective chambers.

5. The combination with a source of supply of material to be measured, of two measuring buckets pivotally-mounted in spaced relation to each other, a movable gravity actuated support for said buckets, converging pendulous links arranged at the respective sides of the source of supply and pivotally connected at their lower ends to said support, and a funnel structure on said support having chambers for feeding material from the source of supply to the respective buckets, said chambers being movable alternately to filling position by actuation of the support, means for temporarily locking said buckets in receiving position relatively to the respective chambers, and means for automatically releasing said buckets in alternation during the successive movements of the said support.

6. The combination with a source of supply of material to be measured, of two measuring buckets pivotally-mounted in spaced relation to each other, a movable gravity actuated support for said buckets, converging pendulous links arranged at the respective sides of the source of supply and pivotally connected at their lower ends to said support, and a funnel structure on said support having chambers for feeding material from the source of supply to the respective buckets, said chambers being movable alternately to filling position, means for temporarily locking said buckets in receiving position relatively to the respective chambers, and means for temporarily locking said support at the end of each chamber positioning movement thereof.

7. The combination with a source of supply of material to be measured, of two measuring buckets pivotally-mounted in spaced relation to each other, a movable gravity actuated support for said buckets, converging pendulous links arranged at the respective sides of the source of supply and pivotally connected at their lower ends to said support, and a funnel structure on said support having chambers for feeding material from the source of supply to the respective buckets, said chambers being movable alternately to filling position, means for temporarily locking said buckets in receiving position relatively to the respective chambers, means for temporarily locking said support at the end of each chamber positioning movement thereof, and means for automatically releasing said buckets in alternation during their movements in respect to said chambers.

8. The combination with a source of supply of material to be measured, of two measuring buckets pivotally-mounted in spaced relation to each other, a supporting frame for said buckets, suspension means for said frame, so constructed that a load in either bucket will effect longitudinal movement of the frame, a funnel structure on said support having chambers for feeding material from the source of supply to the respective buckets, said chambers being movable alternately to filling position by actuation of the frame, means for temporarily locking said buckets in receiving position relatively to the respective chambers, means for temporarily locking said support at the end of each chamber positioning movement thereof, and means for automatically releasing said buckets in alternation during their movements in respect to said chambers.

Signed at Barberton, in the county of Summit and State of Ohio, this 31st day of July, A. D. 1916.

CYRIL OLIVER RHYS WILLIAMS.